US012090713B2

(12) United States Patent
Kremers et al.

(10) Patent No.: US 12,090,713 B2
(45) Date of Patent: Sep. 17, 2024

(54) PREFORMING SYSTEM AND METHOD

(71) Applicant: Airborne International B.V., s-Gravenhage (NL)

(72) Inventors: Marcus Antonius Ivonne Kremers, Amsterdam (NL); Tjalling Stelma, Utrecht (NL); Anders Brødsjø, Delft (NL); Johannes Ludovicus Carola Gerardus De Kanter, Leiderdorp (NL)

(73) Assignee: Airborne International B.V., s-Gravenhage (NL)

( * ) Notice: Subject to any disclaimer, the term of this patent is extended or adjusted under 35 U.S.C. 154(b) by 185 days.

(21) Appl. No.: 17/622,054

(22) PCT Filed: Jun. 25, 2020

(86) PCT No.: PCT/NL2020/050418
§ 371 (c)(1),
(2) Date: Dec. 22, 2021

(87) PCT Pub. No.: WO2020/263093
PCT Pub. Date: Dec. 30, 2020

(65) Prior Publication Data
US 2022/0258437 A1 Aug. 18, 2022

(30) Foreign Application Priority Data
Jun. 25, 2019 (NL) .................................. 2023372

(51) Int. Cl.
*B29C 70/38* (2006.01)
(52) U.S. Cl.
CPC ................. *B29C 70/386* (2013.01)
(58) Field of Classification Search
CPC ..... B29C 70/386; B29C 70/38; B29C 70/382; B29C 70/384; B29C 70/388
See application file for complete search history.

(56) References Cited

U.S. PATENT DOCUMENTS 9,873,230 B1  1/2018 DesJardien et al.
2013/0306233 A1* 11/2013 Pini ........................ B29C 70/543
                                                          156/256
2016/0368226 A1* 12/2016 Encinosa ................ B29C 70/38

FOREIGN PATENT DOCUMENTS

EP          3106280       12/2016
WO    WO-2018/236212     12/2018

OTHER PUBLICATIONS

International Search Report of Written Opinion, International Application No. PCT/NL2020/050418, dated Sep. 17, 2020, 8 pages.

* cited by examiner

*Primary Examiner* — George R Koch
(74) *Attorney, Agent, or Firm* — Quarles & Brady LLP

(57) ABSTRACT

A preforming system for automated sequential laying of plies, in particular fiber reinforced plies, at a desired location with a preselected attitude to preform a composite structure, comprising at least one buffer provided with two or more carriers, a controller, a placement robot provided with a ply manipulating part, and a substrate, wherein each carrier is arranged to carry at least one presorted ply, wherein the controller keeps track of a position, type and sequential order of the at least one presorted ply per carrier, and wherein the controller further controls the placement robot to manipulate and transport at least one ply by means of the ply manipulating part from a selected carrier of the two or more carriers to the substrate and to place the at least one ply at the desired location with the preselected attitude.

18 Claims, 6 Drawing Sheets

PREFORMING SYSTEM AND METHOD

RELATED APPLICATIONS

This application is a 35 U.S.C. § 371 national phase application of PCT/NL2020/050418 (WO 2020/263093), filed on Jun. 25, 2020, entitled "PREFORMING SYSTEM AND METHOD", which application claims the benefit of Netherlands Application No. 2023372, filed Jun. 25, 2019, which is incorporated herein by reference in its entirety.

The invention generally relates to a preforming system comprising a placement robot with a ply manipulating part for automated sequential laying of plies at a desired location with a preselected attitude to preform a composite structure. The invention also generally relates to a method for automated sequential laying of plies at a desired location with a preselected attitude to preform a composite structure.

During the fabrication of composite or so-called laminate structures, generally a group of plies may be sequentially laid up at desired locations on a substrate in order to strengthen, stiffen and/or otherwise provide a structure with required structural and/or performance characteristics. The substrate may include a flat planar surface, a mold, a mandrel or another preforming tool on which the layup process is performed. Often, a layup process may be performed by hand. For example, using hand layup techniques, a technician places each ply individually on the substrate at a precise location and orientation relative to the substrate and/or other plies. The orientation of the ply relative to a fixed reference frame of the substrate is also known as the attitude. Usually, the hand layup process requires plies to be placed one at a time, and ply size may be limited to what the technician can handle manually. The hand layup techniques are time consuming, labor intensive and costly. Also, hand layup techniques may be less suitable for large scale fabrication and/or mass production.

Generally, automated tape laying or automated fiber placement techniques may be used for the fabrication of relatively complex and/or large scale laminate structures. With these techniques fiber reinforcements are placed on or in molds or mandrels in an automatic fashion and are laid up in a number of separate, relatively narrow strips or tows of thermoset or thermoplastic pre-impregnated materials. However, these techniques are not well suited for all applications. Besides, certain ply materials may be relatively delicate and/or susceptible to wrinkling, creasing and/or tearing when processed with these techniques.

An automated system to sequentially layup plies at particular locations on or in the mold or mandrel has previously been proposed so as to free up automated tape laying equipment from laying many relatively small plies in localized areas. For example, in U.S. Patent Publication Number 2012/0330453 A1 an automated ply layup system is shown for filling localized gaps between stringers and frames of an airframe and/or for filling localized pockets in a (curved) mandrel of e.g. (part of) an aircraft fuselage. Thereto, an operator places a tray with a group of plies arranged in a set or so-called kit of plies at a work cell and initiates an automated ply layup cycle. The automated ply layup system then optically recognizes and selects a next ply in the sequence from the kit of plies. Thereafter, the automated ply layup system controls a placement robot with a ply manipulating part to lift the next-in-sequence ply from the kit and to place the ply at a placement location on or in the mold or mandrel based on detected location features at the placement location.

A disadvantage of this system is that the tray of plies is placed by an operator such that there is room for human error. Also, the system may be less suitable for mass production. Further, a drawback is that the system is unfamiliar with the contents of the tray with the kit of plies that is supplied from an external source. Furthermore, the next-in-sequence ply needs to be optically recognized by the placement robot which may slow down the fabrication and may require a costly vision system with relatively complex image recognition and/or processing capability. Also, the placement robot requires a detector, such as a 3-D laser scanner, for detecting locational features at the placement location to place the ply on or in the mold or mandrel.

The invention aims to mitigate at least some of the above mentioned drawbacks. In particular, the invention aims to provide a simplified preforming system for automated sequential laying of plies with which the manufacturing efficiency may be improved. In particular, to provide a cost-effective system with an improved throughput for mass production of composite structures.

Thereto, the invention provides a preforming system for automated sequential laying of plies, in particular fiber reinforced plies, at a desired location with a preselected attitude to preform a composite structure, comprising at least one buffer provided with two or more carriers, a controller, a placement robot provided with a ply manipulating part, and a substrate, wherein each carrier is arranged to carry at least one presorted ply, wherein the controller keeps track of a position, type and sequential order of the at least one presorted ply per carrier, and wherein the controller further controls the placement robot to manipulate and transport at least one ply by means of the ply manipulating part from a selected carrier of the two or more carriers to the substrate and to place the at least one ply at the desired location with the preselected attitude.

By providing a buffer comprising two or more carriers each arranged to carry at least one presorted ply, a convenient arrangement for buffering presorted plies may be obtained. Elegantly, each carriers may be embodied as, or may include shelves or trays. By providing a controller that keeps track of a position, type and sequential order of the at least one presorted ply per carrier, the system is familiar with an assortment of next-in-sequence plies and may anticipate accordingly for efficient throughput of plies.

By providing a placement robot with a ply manipulating part, the system may reduce or prevent ply wrinkling, creasing and/or tearing and may provide more control over the sequential laying of plies. When the controller controls the placement robot to manipulate and transport the at least one ply by means of the ply manipulating part from a selected carrier of the two or more carriers to the substrate and to place the at least one ply at the desired location with the preselected attitude, the automated sequential laying of plies to preform a composite structure may be simplified, e.g. without requiring optical recognition of next-in-sequence plies. In addition, no detector, such as a 3-D laser scanner, is required for detecting locational features at the placement location to adjust the placement of the ply. Thereby, the manufacturing efficiency may be improved, in particular cost-effectively.

By providing an assessment device configured to assess a position and orientation of the at least one ply relative to the ply manipulating part of the placement robot when manipulating the at least one ply from the selected carrier, the assessed position and orientation of the at least one ply may e.g. be translated into a 3-D spatial coordinate system of the placement robot by applying offsets to the assessed position and orientation or using other techniques. When the assessment device is coupled to the controller, and wherein the controller controls the placement robot at least partly based on the assessed position and orientation to place the at least one ply at the desired location with the preselected attitude, a relatively accurate placement may be obtained.

When the assessment device is a stationary optical device, wherein the controller controls the placement robot to present the at least one ply to the stationary optical device for assessing the position and orientation of the at least one preselected ply relative to the ply manipulating part of the placement robot, the position and orientation may be assessed reliably and/or reproducibly while facilitating a relatively unobstructed view of the at least one ply by the stationary optical device. In particular, an outer surface of the at least one ply may be presented in a substantially planar orientation to facilitate the assessment.

When the controller controls the placement robot based only on the assessed position and orientation of the at least one ply relative to the ply manipulating part of the placement robot to align the at least one ply for placement at the desired location with the preselected attitude, the at least one ply that is next-in-sequence may conveniently be brought into a proper alignment for relatively accurate placement. That is to say, without requiring optical recognition to select the correct next-in-sequence ply and/or without requiring detection of locational features for adjusting placement. Therefore, by properly aligning the at least one ply for placement based on the assessed position and orientation, blind transport and placement may be facilitated. In particular, placement may remain unhindered en route to the substrate and during placement, while placement at the desired location with the preselected attitude is ensured.

When the carriers are movable relative to the at least one buffer and to each other, a flexible configuration may be obtained. When the controller controls the movement of the carriers and/or the at least one buffer such that, during use, the at least one ply is made available to at least the ply manipulating part of the placement robot for manipulation and transport of the at least one ply from the selected carrier, the at least one ply that is next-in-sequence may conveniently be made available to the ply manipulation part of the placement robot. This way, the placement robot may at least partially be freed up for placement of the at least one ply, improving the preforming throughput. In particular, the selected carrier may be made available at a predetermined delivery point to further facilitate the placement robot and save handling time.

Advantageously, each carrier may comprise a substantially planar support face. This way, plies including for example pliable sheet-like or planar materials, may be supported in a substantially planar orientation, which reduces the chance of damage. Also, by arranging each carrier to comprise a substantially planar support face, the carrier may be standardized to support plies of different manufacture, such as plies cut from a sheet, plies sectioned from a web of tape, and ply parts or components from e.g. automated tape laying equipment to be assembled into a composite structure.

When the system comprises at least one sorting robot provided with a handling part for handling and transporting at least one ply, wherein the controller or a further controller controls the at least one sorting robot to selectively load each carrier of the at least one buffer with at least one ply, each carrier of the at least one buffer may conveniently be loaded selectively using the sorting robot. Thereby, each carrier may be loaded with a presorted ply of a certain type having a known position and sequential order. Also, a particularly convenient system may be obtained, by combining the sorting robot for selectively loading each carrier with the movable carriers described herein above. This way, each carrier may be moved to a loading position that allows selective loading of at least one ply and a make available position that allows manipulation of the at least one ply for placement. Optionally, each carrier may be moved to a buffering position in which the carriers have a covering arrangement that prevents selective loading and manipulation of the at least one ply. Such covering arrangement saves space, counteracts faulty sequential layup and/or prevents contamination due to sheltering.

When the preforming system is arranged such that during use the sorting robot and the placement robot can access a same buffer of the at least one buffer without relocating the placement robot, the sorting robot and the buffer with respect to each other, a particularly compact and versatile system can be provided, in particular with a relatively small footprint. To that end the buffer and the robots may be dimensioned and/or located such that a same buffer is within reach for both robots, for example at the same time and/or interchangeably, in particular with relatively little delay. It will be appreciated that said robots and buffer may still be relocatable with respect to each other.

Whereas traditionally ply sorting precedes ply placement and preforming in a substantially one-way flow, such a configuration enables more freedom in terms of sequentially ordering sorting, placement and preforming activities in a preforming system.

Advantageously, placement and sorting activities can thus be executed in various sequential orders as needed, with particularly low robotic idle time. The buffer or buffers can thus be used particularly efficiently, wherein for example a robot can place intermediate products such as half-finished preforms in the same buffer that is used for holding plies, e.g. back in the same buffer that plies for the preform were taken out of. In this sense, a material flow can thus be reversed.

The sorting robot and/or the placement robot are optionally configured to take one or more carriers out of the buffer, and/or to place one or more carriers into the buffer, for example each from a different side of the buffer and/or each from a same side of the buffer. During said taking out and/or placing a carrier of the one or more carriers for example holds one or more items such as one or more plies and/or one or more intermediate products such as preforms, in particular such that the one or more items are thereby exchanged between two or more of the sorting robot, the placement robot and the buffer.

The sorting robot and the placement robot are optionally at least partially integrated with each other, in particular such that both robots can access the same buffer. Said buffer can be integrated with the integrated robots. The sorting robot and the placement robot can be at least partially integrated by for example sharing a common robot arm which is configured for both placement and sorting, e.g. selectively configured for placement or for sorting. Preferably such an integrated robot is configured to automatically switch between a sorting mode and a placement mode. Alternatively or additionally such robots can be at least partially integrated by sharing a controller, a motor and/or a housing.

When the buffer is configured to be accessed by multiple robots, or by a robot and an operator, at the same time, items such as plies and intermediate products can advantageously be exchanged relatively freely between robots and/or between a robot and an operator. Preferably the buffer is to that end accessible from at least two sides, e.g. two opposite sides, of the buffer.

An additional robot, for example a sorting robot and/or a placement robot, can thus be deployed at the same buffer if and when needed to increase processing capacity in a particularly dynamic and versatile manner. Alternatively or additionally an operator can thus advantageously place, replace and/or remove items from the buffer, e.g. manually, without disturbing a robot which is active at the same buffer.

When each carrier is releasably mounted to the at least one buffer, each carrier may be removed from the at least one buffer for selective loading of the at least one ply and/or manipulation of the at least one ply for placement. In other words, each carrier may transit through the at least one buffer, e.g. to be placed conveniently for selective loading by the at least one sorting robot and/or to be placed near the substrate for further reducing handling time of the placement robot. In addition, when at least two buffers are provided, the releasably mounted carriers may be transferred between buffers. Elegantly, the shelves or trays may be removable from each carrier. Each carrier, shelf and/or tray may be removable from the at least one buffer. This way, at least one ply may be loaded to or offloaded from the at least one buffer with a carrier, shelf or tray.

By further arranging the handling part of the at least one sorting robot to handle carriers, such that the carriers are transferrable between buffers by means of the sorting robot, the at least one sorting robot may conveniently transfer, i.e. transport and (un)mount, carriers carrying at least one pre-sorted ply to and/or transfer e.g. empty carriers from the at least one buffer. Thereby, (empty) carriers may be selectively loaded with at least one ply by the at least one sorting robot remote from the buffer and/or carriers with at least one presorted ply may be transferred to the at least one buffer further reducing handling time and increasing manufacturing efficiency.

By providing a transportation track and a plurality of buffers disposed along the transportation track, wherein the transportation track comprises a manipulator for manipulating and transporting at least one ply along the transportation track between the plurality of buffers, plies may conveniently be transported between the buffers. The manipulator may e.g. be or comprise a moving belt surface or driven rollers arranged to transport plies in a substantially planar orientation, or may comprise product holders arranged to hold at least one ply and that are arranged to be moved individually along the transportation track to visit buffers. Additionally or alternatively, the manipulator may be arranged to transport carriers or shelves between the buffers. In particular, the manipulator may be or may comprise the at least one sorting robot, such that the at least one sorting robot is transportable along the transportation track between the plurality of buffers. Thereto, the transportation track may e.g. be a guide comprising a sliding rail for slidingly transporting the at least one sorting robot along the transportation track and/or a gantry system.

By providing at least one ply feed, such as a feed associated with the output of a sheet cutter, a tape sectioner or an automated tape-laying device, a production line may be achieved in an elegant way. This way, at least one ply from at least one ply feed may conveniently be kept track of for automated sequential laying of plies, e.g. from feed to preform. Thereby, the manufacturing efficiency may be further improved, especially a cost-effective system with an improved throughput for mass production of composite structures.

Advantageously, the at least one sorting robot may be arranged to transport at least one ply from the at least one ply feed and to the at least one buffer to selectively load each carrier of the at least one buffer.

In an elegant way, the at least one buffer and the at least one ply feed may be disposed along a transportation track comprising a manipulator for manipulating and transporting at least one ply along the transportation track between the at least one ply feed and the at least one buffer, similar as described hereinabove for the system comprising a plurality of buffers. In particular, the manipulator may be or may comprise the at least one sorting robot, such that the at least one sorting robot is transportable along the transportation track between the at least one ply feed and the at least one buffer. Preferably, the at least one ply feed and the plurality of buffers are disposed along the transportation track.

By providing each ply feed with a dedicated feed buffer, plies from the at least one ply feed may conveniently be buffered as the positioning and sequential ordering of plies on one of the carriers generally outpaces the placement of plies at the desired location with a preselected attitude on the substrate. That is to say, plies are fed to the preforming system faster than a composite structure can be preformed, because of the higher degree of accuracy that is required for placement versus positioning and sequential ordering of plies for layup, especially if plies from more than one feed are required for preforming said composite structure. By providing at least one supply robot for handling and transporting at least one ply, wherein the controller or a further controller controls the at least one supply robot to selectively load each carrier of the dedicated feed buffer with at least one ply, the throughput may be further improved by automated positioning and sequential sorting of plies from each ply feed in its dedicated feed buffer and freeing up each ply feed to obtain higher ply production rates while providing buffering for the preforming of composite structures. This may be particularly advantageous for mass production of composite structures.

The invention further provides for a method for automated sequential laying of plies, in particular fiber reinforced plies, at a desired location with a preselected attitude to preform a composite structure, comprising the steps of providing a buffer with at least two carriers, providing each carrier with at least one ply of the same type, such that the carriers in-a-whole carry at least two types of plies, keeping track of a position, type and sequential order of each at least one ply on each carrier of the buffer, selecting a carrier from the at least two carriers to make the selected carrier with at least one ply available to a ply manipulating part of a placement robot, manipulating the at least one ply from the selected carrier by means of the ply manipulating part of the placement robot, transporting the at least one ply by means of the placement robot to a substrate, placing the transported at least one ply by means of the ply manipulating part at a desired location with a preselected attitude on the substrate.

For aligning the manipulated at least one ply for placement at the desired location with the preselected attitude a position and an orientation of the manipulated at least one ply relative to the ply manipulating part may be assessed. Preferably, the alignment is based only on the assessed position and orientation of the manipulated at least one ply relative to the ply manipulating part of the placement robot as discussed above. This allows more efficient and cost-effective manufacturing. To facilitate assessing the position and orientation of the manipulated at least one ply relative to the ply manipulating part, an image of the ply on the ply manipulating part may be recorded.

By feeding at least one ply from a ply feed, in particular a ply feed associated with an output of e.g. a sheet cutter, a tape sectioner or an automated tape-laying device, and keeping track of the position, type, and sequential order of the at least one ply fed from the ply feed, a particularly efficient process for fabricating composite preforms may be obtained that requires relatively little feedback, such as detection and inspection steps.

Typically plies may be pliable sheet-like or planar materials that are to be laid up sequentially for fabrication of composite or laminated structures. A variety of plies may be manipulated, i.e. lifted, oriented and/or placed, by the ply manipulating part, such as thermoplastics, prepregs, thermosets, metal foils, backing material and adhesive layers. Within the context of this application, the term "ply" should be construed to include a wide variety of shapes and reinforced plastics. Often, reinforced plastics may comprise fiber reinforced material with a dispersed reinforcement phase embedded in a continuous matrix phase having a fine interphase region. In general, the reinforcement is in the form of (dis)continuous fibers, such as carbon fibers or aramid fibers, embedded in a matrix material, such as thermosetting resin or thermoplastic plastics material. In addition, the plies may comprise a backing material. Such plies are generally known and are used for manufacturing laminated or composite products.

The invention will be further elucidated on the basis of exemplary embodiments which are represented in the drawings. The exemplary embodiments are given by way of non-limitative illustration of the invention. In the drawings.

It is noted that the figures are only schematic representations that are given by way of non-limited example. In the figures, the same or corresponding parts are designated with the same reference numerals.

Figure 1:
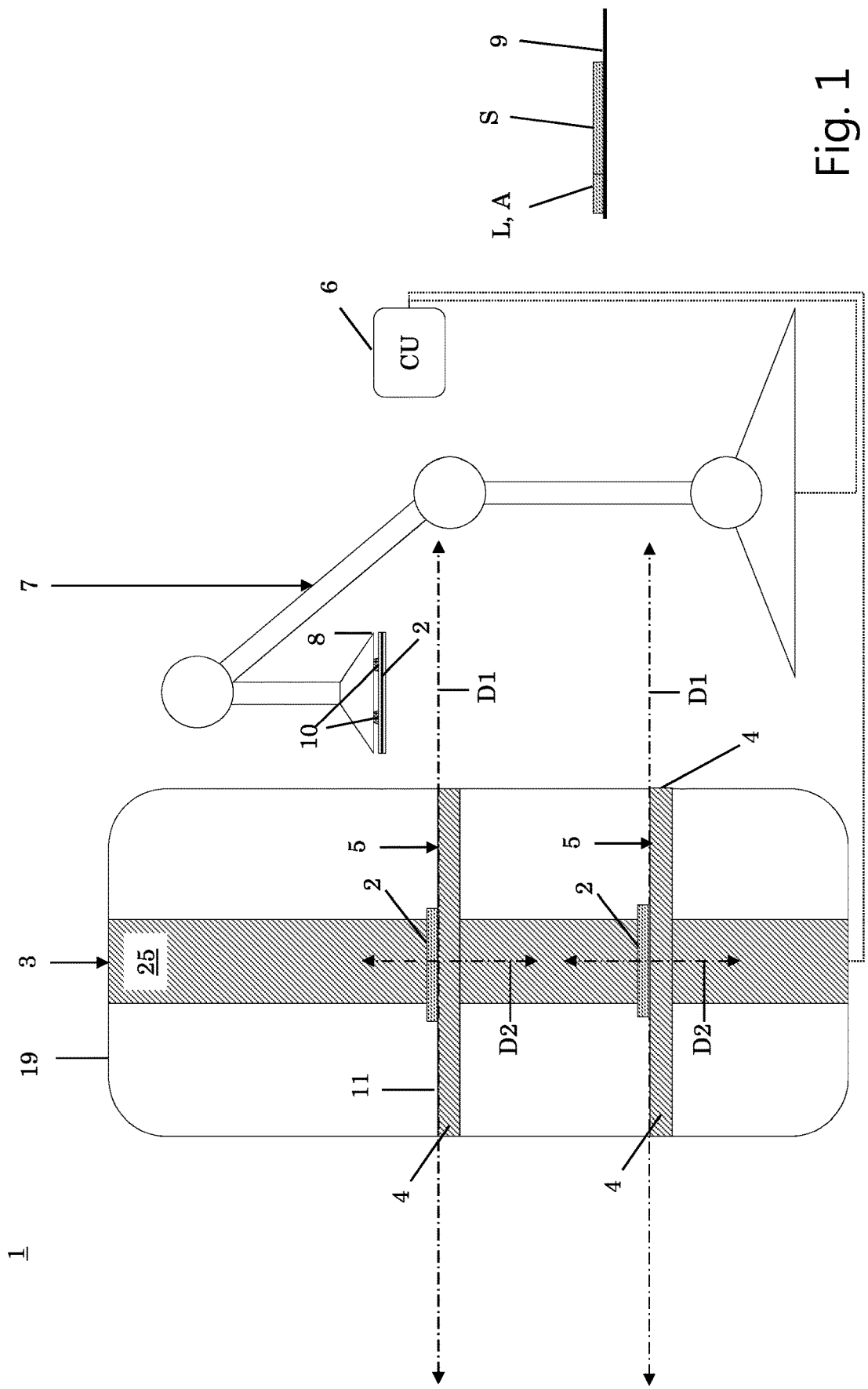
FIG. 1 shows a schematic side and partial cross sectional view of a preforming system according to a first embodiment of the invention.

FIG. 1 shows a schematic drawing of a preforming system 1 according to a first embodiment of the invention for automated laying of plies 2, in particular fiber reinforced plies, at a desired location L with a preselected attitude A to preform a composite structure. The preforming system 1 comprises a buffer 3 provided with two carriers 4. More than one buffer 3 may also be provided, such as two, three, four or more, each comprising two or more carriers 4, such as three, four, five, or more carriers 4. Each carrier 4 is arranged to carry at least one presorted ply 2 as illustrated by the partial cross sectional view of the buffer 3. In the exemplary embodiment, the carriers 4 are each provided with a substantially planar support face 5 that support four presorted plies 2 in a substantially planar orientation. The four presorted plies 2 are positioned on each carrier 4 and have a sequential order, such that the plies 2 are arranged in a set, or so-called "kit". Each carrier 4 may be provided with various types of plies 2, e.g. plies of different manufacture. The plies 2 may include a wide variety of shapes and reinforced plastics, and may also include metal foils, backing material and adhesive layers.

The preforming system 1 comprises a controller 6 that keeps track of a position, type and sequential order of the at least one ply 2 per carrier 4. In the exemplary embodiment, the controller 6 is familiar with the position, type and sequential order of the four presorted plies 2 on each carrier 4. The controller 6 further controls a placement robot 7 provided with a ply manipulating part 8. The placement robot 7 is embodied as a robotic arm, but another type of moving device for the manipulating part 7 may be provided, e.g. a simple rail with a movable carriage or a gantry system. The ply manipulating part 8 is for manipulating, i.e. lifting and orienting, at least one ply 2 from one of the two carriers 4 and place the at least one ply 2 on a substrate 9 of the preforming system 1. Preferably, the substrate 9 is a substantially flat, smooth plate, but may also be mold or mandrel or so-called "tool". To preform a composite structure S, plies are sequentially laid up on or in the substrate 9 at a desired location L with a preselected attitude A (i.e. orientation relative to the substrate 9). In general, the preform is to be consolidated by applying heat and/or pressure to form the final composite part. For manipulating at least one ply 2, the ply manipulating part 8 is provided with a gripper 10 arranged to grip the at least one ply 2, such as a flat surface of a sheet-like or planar ply or a set of plies together. The gripper 10 may e.g. be a vacuum operated gripper for holding the at least one ply 2 against the gripper with a vacuum or an electroadhesive gripper for holding the at least one ply 2 against the gripper with a electrostatic adhesive force between the gripper and the ply.

The controller 6 further controls the placement robot 7 to manipulate and transport the at least one ply 2 by means of the ply manipulating part 8 from a selected carrier 11 of the two carriers 4 to the substrate 9 and to place the at least one ply 2 at the desired location L with the preselected attitude A.

The carriers 4 are movable relative to each other and to the buffer 3, in particular the carriers 4 are movable along their plane (illustrated by first direction D1) and are movable perpendicular to their plane (illustrated by second direction D2). Here, the carriers 4 are placed in a column, and are liftably and slidably mounted to a frame 25 of the buffer 3 transversely to a longitudinal direction of the carriers 4 (not shown). The controller 6 controls the movement of the carriers 4, such that, during use, the at least one ply 2 is made available to at least the ply manipulating part 8 of the placement robot 7 for manipulation and transport of the at least one ply 2 from the selected carrier 11. For example, the controller 6 may lift the carriers 4 along second direction D2 with variable interspace to accommodate the ply manipulating part 8 between the carriers 4 and/or may slide the selected carrier 11 towards the placement robot 7 along first direction D1. Alternatively, the carriers 4 may e.g. be fixed in a position relative to each other and the buffer 3, or the carriers 4 may e.g. be either liftably or slidably mounted to the frame 25 of the buffer 3.

Figure 2:
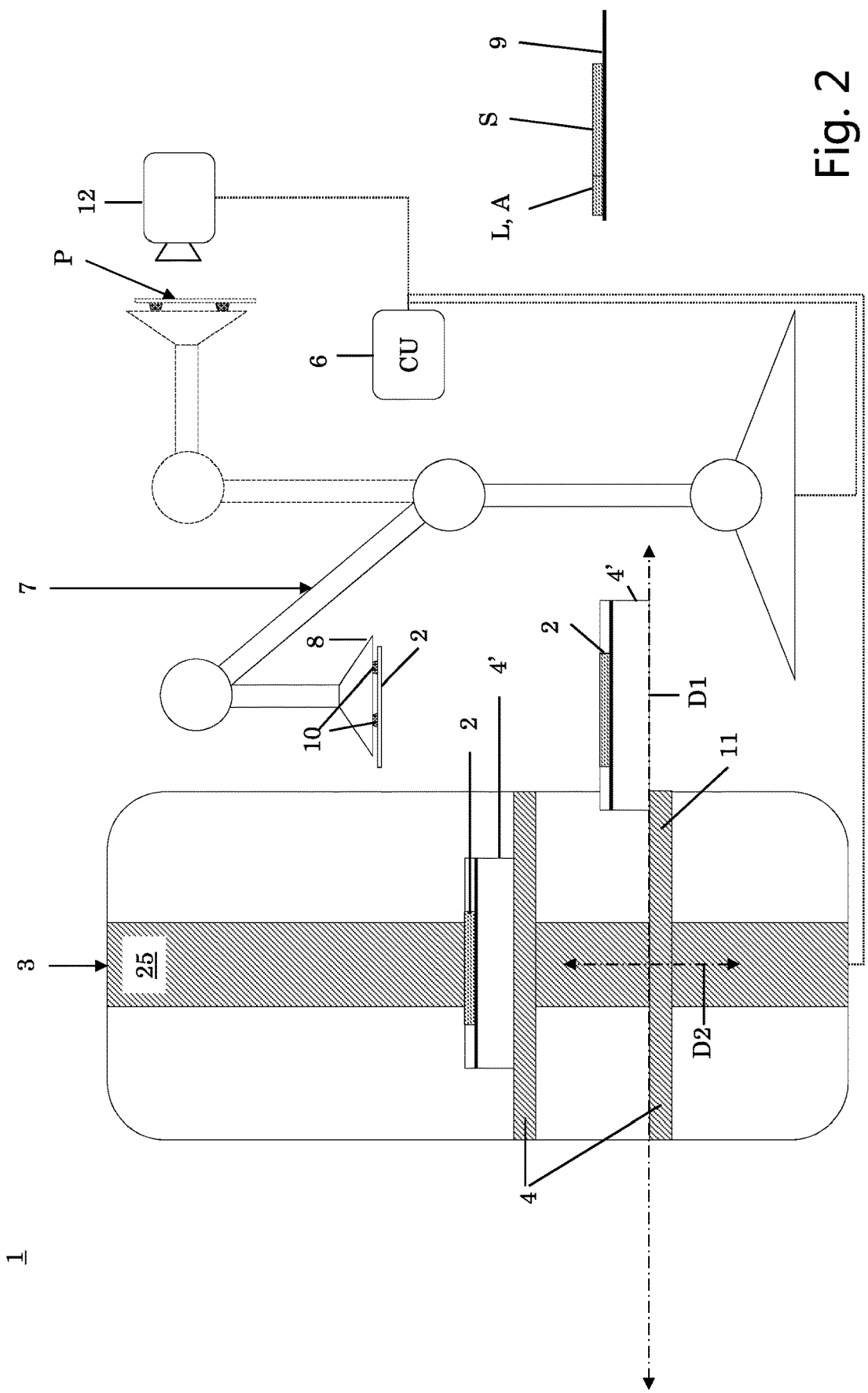
FIG. 2 shows a schematic side and partial cross sectional view of the system of FIG. 1 according to a second embodiment of the invention.

FIG. 2 shows a schematic drawing of the preforming system 1 according to a second embodiment of the invention. Each carrier 4 includes a tray 4', so that the plies 2 may be supported in a protected trough. Alternatively, the carriers 4 themselves may be embodied as trays. The preforming system 1 comprises an assessment device 12 configured to assess a position and orientation P of the at least one ply relative to the ply manipulating part 8 of the placement robot 7 when manipulating the at least one ply 2 from the selected carrier 11. That is to say, the at least one ply 2 lifted from the selected carrier 11 by means of the ply manipulating part 8. Advantageously, the assessed position and orientation P of the at least one ply may e.g. be translated into a 3-D spatial coordinate system of the placement robot 7 by applying offsets to the assessed position and orientation P of the at least one ply 2 or using other techniques. The assessment device 12 is coupled to the controller 6 such that the controller 6 controls the placement robot 7 at least partly based on the assessed position and orientation P to properly place the at least one ply 2 at the desired location L with the preselected attitude A. In particular, the controller 6 controls the placement robot 7 to align the at least one ply 2 by means of the ply manipulation part 7 based only on the assessed position and orientation P for accurate and/or proper placement at the desired location L with the preselected attitude A. Here, the assessment device 12 is a stationary optical device, such as a camera or laser scanner. The controller 6 controls the placement robot 7 to present the at least one ply 2, in particular in a planar orientation, to the stationary optical device for assessing the position and orientation P relative to the ply manipulating part 8. Additionally or alternatively, the assessment device 12 may e.g. be arranged along a transport zone (not shown) of the placement robot 7 or may e.g. be attached to the ply manipulating part 8 of the placement robot 7 (not shown). The transport zone of the placement robot 7 is bounded by an operational domain of the placement robot 7, in particular e.g. an operational domain between the carriers 4 and the substrate 9.

Figure 3:
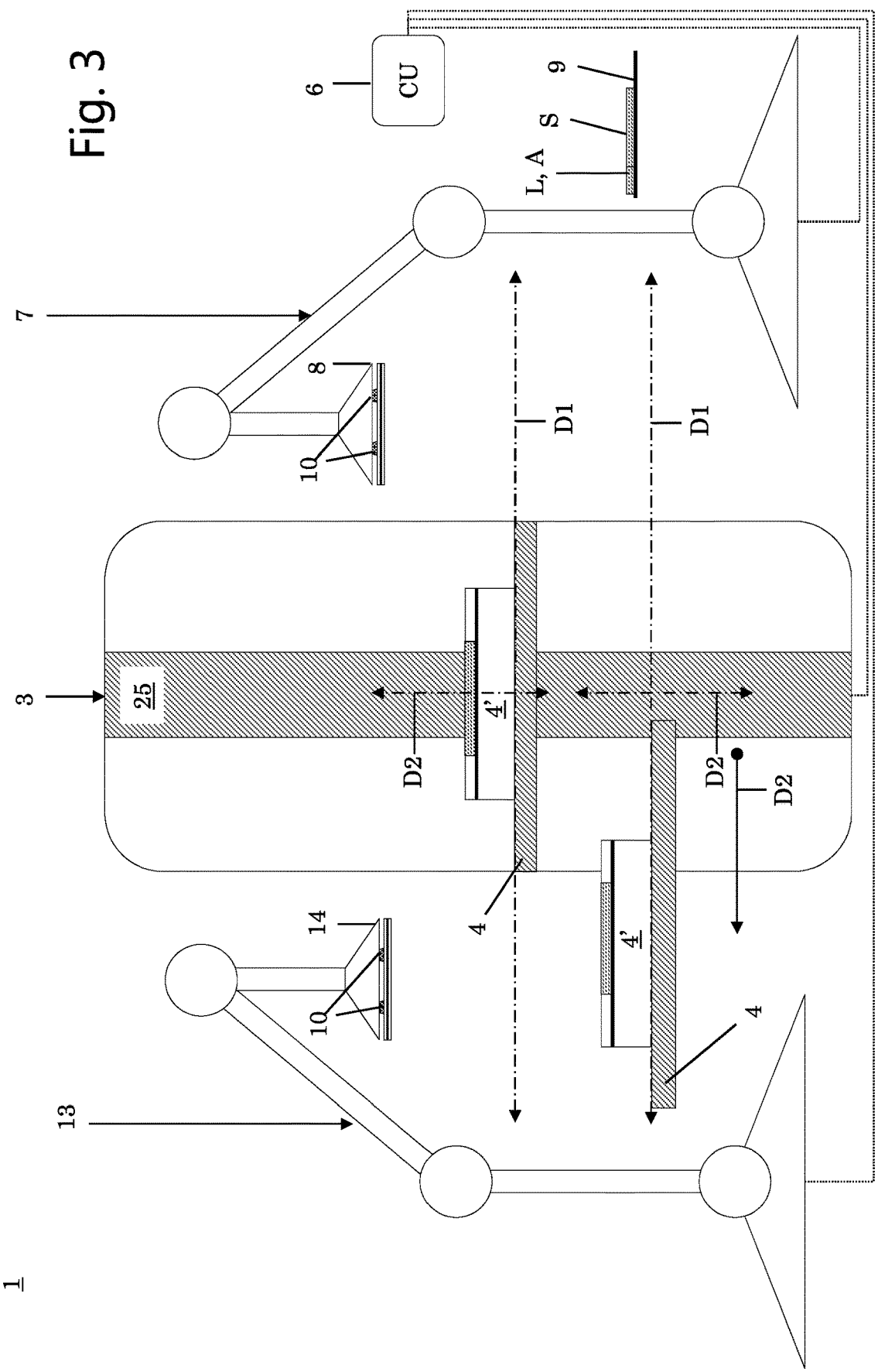
FIG. 3 shows a schematic side and partial cross sectional view of the system of FIG. 1 according to a third embodiment of the invention.

FIG. 3 shows a schematic drawing of the preforming system 1 according to a third embodiment of the invention. The preforming system 1 comprises a sorting robot 13 provided with a handling part 14 for handling and transporting at least one ply 2. The handling part 14 may be provided with a gripper 10 arranged for gripping at least one ply 2, as described hereinabove. The controller 6 controls the sorting robot 13 to selectively load each carrier 4 of the buffer 3 with at least one ply 2. Alternatively, a further controller may be provided for controlling the sorting robot 13, preferably wherein the further controller is coupled to the controller 6, e.g. via a physical or wireless connection. In this exemplary embodiment, one of the carriers 4 is slid along the first direction D1 out of the column to make the tray 4' provided on the carrier 4 available to the handling part 14 of the sorting robot 13 for selectively loading the carrier 4. The controller 6 keeps track of the position, type and sequential order of each at least one ply 2 on each carrier 4 of the buffer 3, such that a next-in-sequence ply may be made available to the ply manipulating part 8 of the placement robot 7 for automated sequential laying of plies on the substrate 9.

Figure 4:
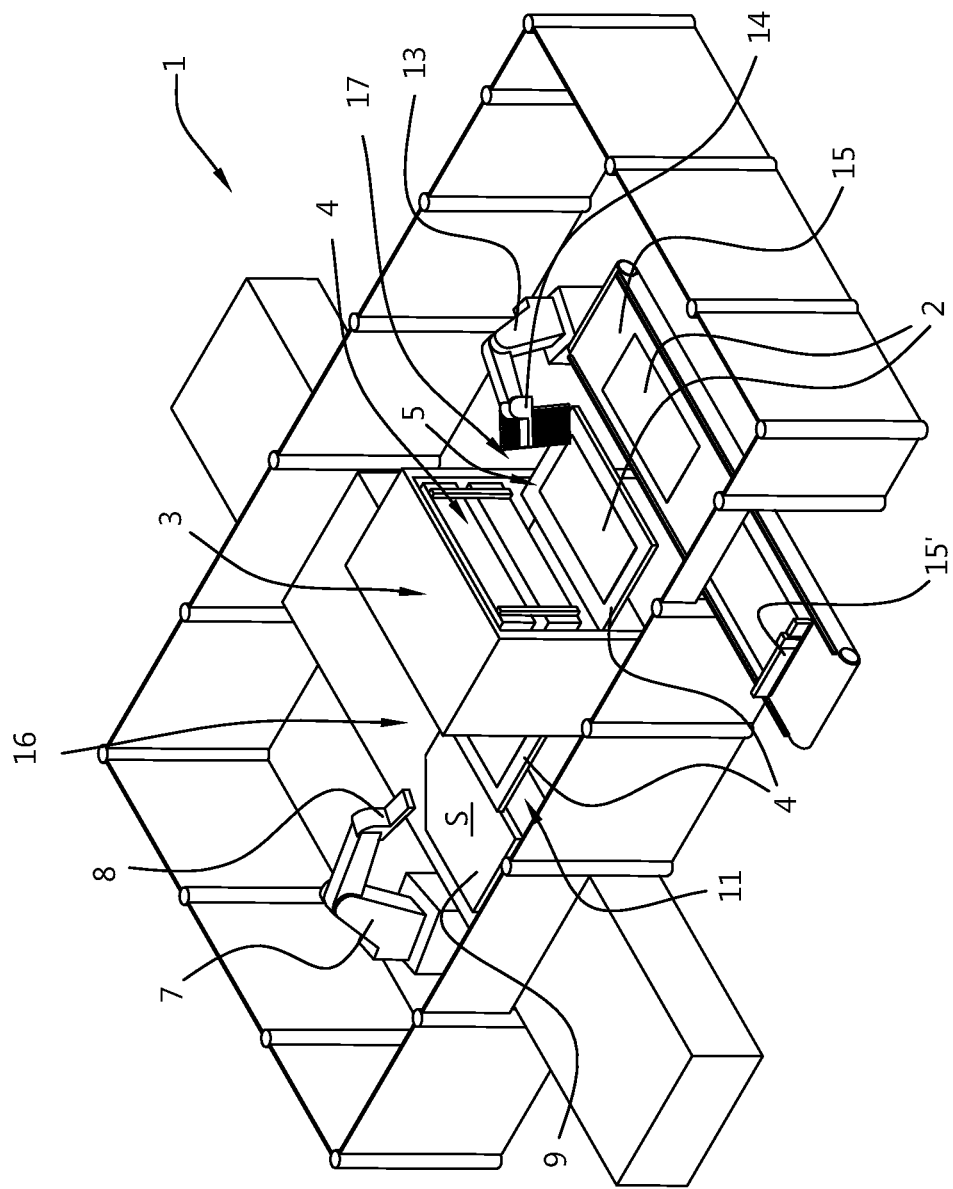
FIG. 4 shows a schematic perspective view of the preforming system according to a fourth embodiment of the invention.

FIG. 4 shows a schematic drawing of the preforming system 1 according to a fourth embodiment of the invention. The preforming system 1 comprises a ply feed 15 associated with the output of a sheet cutter 15'. The output of the sheet cutter 15' in this example comprises a flat conveyor belt with cutouts for plies of different geometries. Additionally or alternatively, the or another ply feed 15 may be associated with the output of at least one tape sectioner e.g. comprising product holders for holding plies sectioned off from a web of tape, provided on a conveyor track for transport along the at least one tape sectioner and a delivery point.

The sorting robot 13 is arranged to manipulate and transport at least one ply 2 from the ply feed 15 to the buffer 3, so as to selectively load each carrier 4 with at least one presorted ply 2. Plies of different geometries may typically together make up a presorted set of plies, but the presorted set of plies may also comprise or even consist of plies of the same geometry.

The buffer 3 is provided with a plurality of movable carriers 4 arranged in a column, wherein the carriers 4 are arranged to slide outwards at opposite sides 16, 17 of the column and are liftably mounted to the frame 25 of the buffer 3. Advantageously, a first side 16 of the buffer 3 transverse to the first direction D1 faces the ply feed 15 and an opposite side 17 to the first side 16 faces the substrate 9. This way, it may be counteracted that the placement robot 7 and sorting robot 13 hinder each other while operating simultaneously. The selected carrier 11 is slid out of the column on the opposite side 17, such that at least one ply 2 is made available to the manipulating part 7 of the placement robot 7, while simultaneously another carrier 4 is slid out of the column at the first side 16 for selectively loading said carrier 4 with plies from the ply feed 15 using the sorting robot 13.

Figure 5:
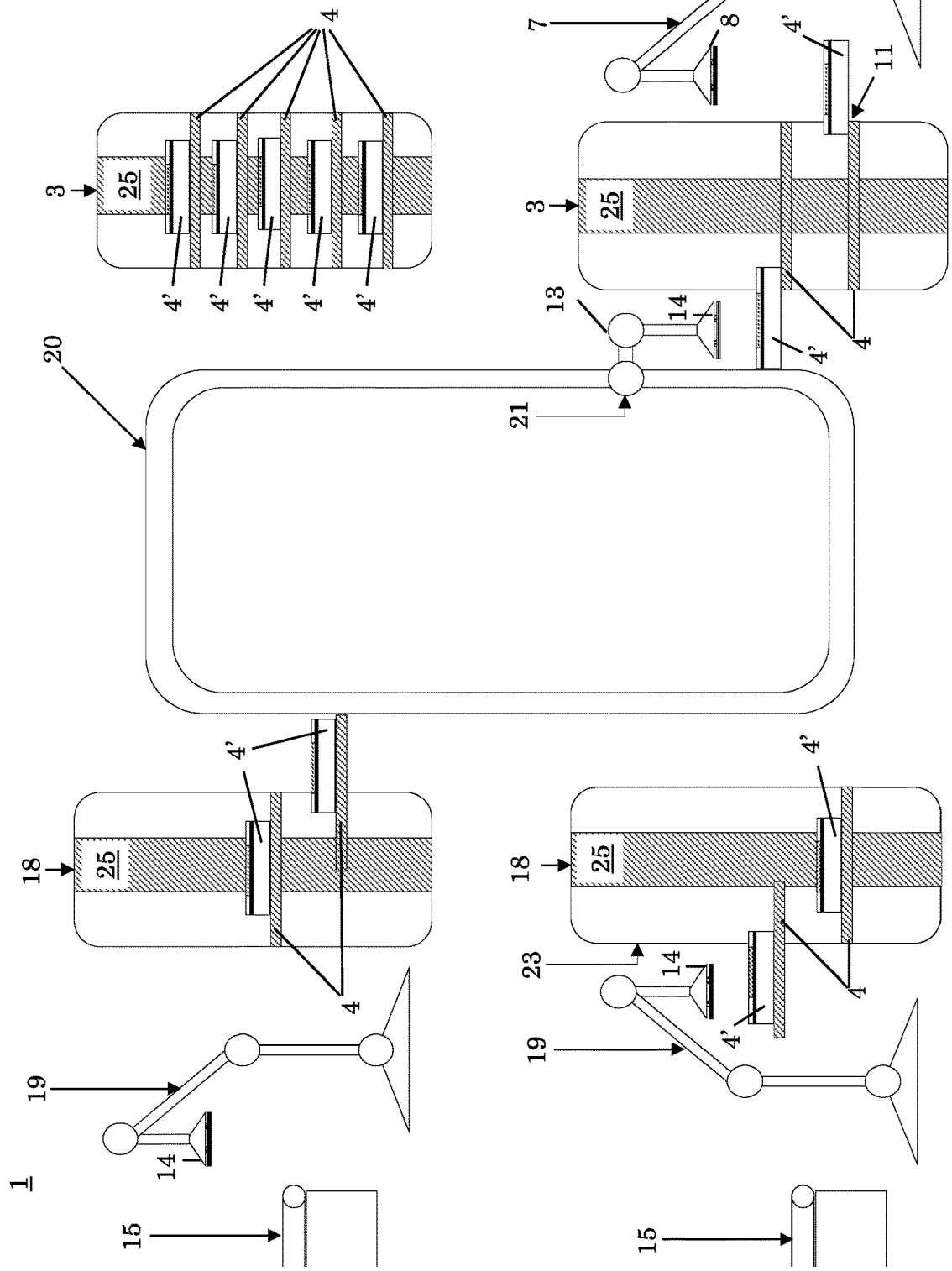
FIG. 5 shows a schematic side and partial cross sectional view of the system of FIG. 1 according to a fifth embodiment of the invention.

FIG. 5 shows a schematic drawing of the preforming system 1 according to a fifth embodiment of the invention. In this exemplary embodiment, the preforming system 1 comprises two ply feeds 15 each provided with a dedicated feed buffer 18 and with a supply robot 19 provided with a handling part 14, as described hereinabove for the sorting robot 13. Each dedicated buffer 15 comprises at least one movable carrier 4 provided with a tray 4', as described hereinabove. Each supply robot 19 is arranged for handling and transporting at least one ply 2 by means of its handling part 14. The controller 6 controls each supply robot 19 to selectively load each carrier 4 of the dedicated buffer 18 associated with its ply feed 15 with at least one ply 2. Further, the preforming system 1 comprises two buffers 3. The two buffers 3 and the two ply feeds 15 with their dedicated buffers 18 are disposed along a transportation track 20. The transportation track 20 comprises a manipulator 21 for transporting at least one ply 2 along the transportation track 20 between the ply feeds 15 and/or the buffers 3. Here, the manipulator 21 comprises the sorting robot 13 and a moving device, e.g. a movable carriage, for moving the sorting robot 13 along a simple rail that forms the transportation track 20. Additionally or alternatively, the transportation track 20 may comprise a moving belt surface or driven rollers arranged to transport at least one ply 2 in a substantially planar orientation, or may comprise product holders arranged to hold at least one ply 2 and that are arranged to be moved individually along the transportation track 20 to visit buffers 3, 18.

In the exemplary embodiment, one of the buffers 3 comprises five carriers 4 each provided with a tray 4'. This buffer 3 is arranged for temporarily buffering plies, preferably sets or kits of plies, before they are moved to the buffer 3 adjacent to the placement robot 7. This way, a convenient arrangement for buffering presorted plies may be obtained while the system is familiar with an assortment of next-in-sequence plies and may anticipate accordingly for efficient throughput of plies. In particular, the manufacturing efficiency may be improved, especially for mass production of composite structures.

Figure 6:
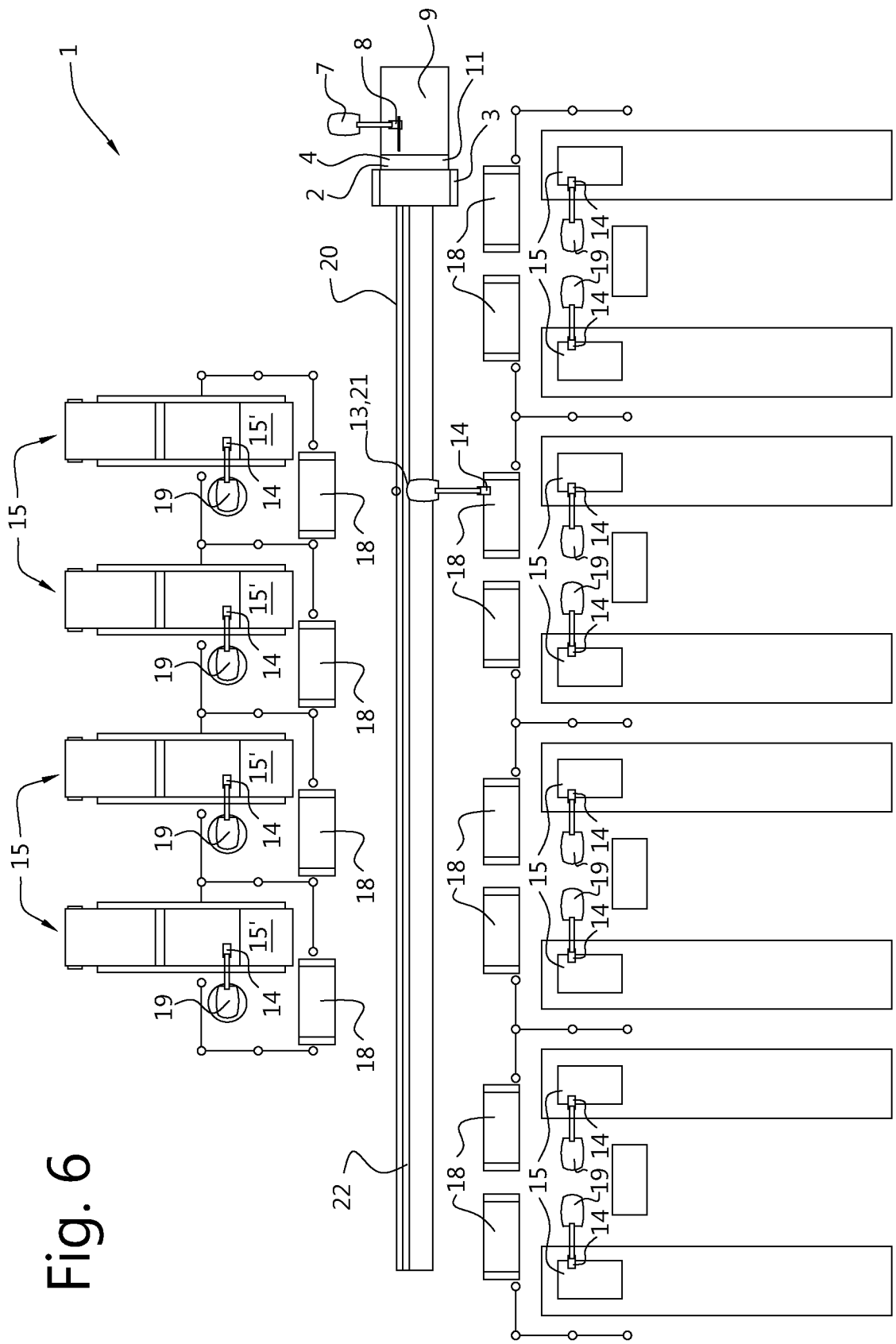
FIG. 6 shows a schematic top view of a preforming system according to the fifth embodiment of the invention.

FIG. 6 shows a schematic top view of the preforming system 1 according to the fifth embodiment of the invention. In this exemplary embodiment, the preforming system comprises a plurality of ply feeds 15 each provided with a dedicated buffer 18 and a supply robot 19 comprising a handling part 14 for handling and transporting at least one ply 2. Additionally or alternatively, pairs of ply feeds 15, or more than two ply feeds 15 may share a common dedicated buffer 18 and/or common supply robot 19 with handling part 14. In this example, the four ply feeds 15 illustrated on the top side of FIG. 6 are each associated with an output of a sheet cutter 15' and the eight ply feeds 15 depicted on the bottom side of FIG. 6 are each associated with an output of an automated tape laying device. Additionally or alternatively, other types of ply feeds may be used e.g. an output associated with a tape sectioner or additive manufacturing device. The plurality of ply feeds 15 is not limited to the number of ply feeds shown in this exemplary embodiment, two, three, four or any number of ply feeds 15 may be provided. The plurality of ply feeds 15 are disposed along a transportation track 20, in particular a gantry system, comprising a manipulator 21 for transporting at least one ply 2 along the transportation track 20 between the ply feeds 15 and/or a buffer 3. The transportation track 20 comprises at least one guide rail 22 for guiding the manipulator 21 along the transportation track 20. Here, the buffer 3 is provided at a distal end of the transportation track 20. Additionally or alternatively, more than one buffer 3 and/or more than one substrate 9 may be provided, for example disposed along the transportation track 20 up- or downstream of the dedicated buffers 18. A carrier 4, in particular selected carrier 11, of the buffer 3 is shown to make at least one ply available to a placement robot 7 that is provided adjacent to a substrate 9 of the preforming system 1. A controller (not shown) of the preforming system 1 keeps track of a position, type and sequential order of the at least one presorted ply 2 per carrier 4. The controller (not shown) further controls the placement robot 7 to manipulate and transport at least one ply 2 by means of the ply manipulating part 8 from the selected carrier 11 to the substrate 9 and to place the at least one ply 2 at the desired location L with the preselected attitude A.

The invention is not limited to the exemplary embodiments shown here. Embodiments may be combined or aspects of embodiments may be isolated or combined with aspects of other embodiments. Many variations will be apparent to the skilled person in the art. For example, the system may include a plurality of buffer stations for storing and transitioning plies, and/or robots for manipulating, in particular lifting and orienting, placing, and transporting plies. For instance, the system may comprise releasably mounted carriers and/or removable trays e.g. to be conveniently placed in the vicinity of a robot to reduce handling time or to be conveniently transferred between buffers in case more than one buffer is provided. In addition, the handling part of the sorting robot and/or supply robot may be arranged to handle carriers and/or trays, such that the carriers are transferrable between buffers. The handling part may e.g. comprise a gripping element, such as a hook, catch or clasp, for reaching into a handling aperture provided on the carrier and/or tray, such that the gripping element may hook behind a periphery of the handling aperture in a manner known to the skilled person. This way, carriers and/or trays with at least one ply or e.g. empty carriers and/or trays may be transferred between buffers or transported to and from the placement robot by means of the sorting robot and/or supply robot. Further, the carriers and/or trays may be handled and/or loaded manually by an operator. Furthermore, the ply feed may be associated with the output of automated tape laying equipment, in particular a laminate on a tool that is to be assembled on the composite structure on the substrate.

Such variations are understood to be comprised within the scope of the invention defined in the appended claims.

LIST OF REFERENCE NUMERALS

1. Preforming system
2. Ply
3. Buffer
4. Carrier
4'. Tray
5. Planar support face
6. Controller
7. Placement robot
8. Ply manipulating part
9. Substrate
10. Gripper
11. Selected carrier
12. Assessment device
13. Sorting robot
14. Handling part
15. Ply feed
15'. Output of sheet cutter
16. First side
17. Opposite side
18. Dedicated feed buffer
19. Supply robot
20. Transportation track
21. Manipulator
22. Guide rail
25. Frame of the buffer
A. Preselected attitude
L. Desired location
P. Assessed position and orientation
S. Composite structure
D1. First direction along a plane of the carrier
D2. Second direction perpendicular to plane of the carrier

The invention claimed is:

1. A preforming system for automated sequential laying of plies at a desired location with a preselected attitude to preform a composite structure, comprising at least one buffer provided with two or more carriers, a controller, a placement robot provided with a ply manipulating part, and a substrate on which a layup process is to be performed, wherein each carrier is arranged to carry at least one presorted ply, wherein the controller keeps track of a position, type and sequential order of the at least one presorted ply per carrier, and wherein the controller further controls the placement robot such that during use the placement robot manipulates and transports the at least one ply by means of the ply manipulating part of the placement robot from a selected carrier of the two or more carriers to the substrate and places the at least one ply on the substrate at the desired location with the preselected attitude as part of the layup process, wherein the preforming system comprises at least one sorting robot provided with a handling part for handling and transporting the at least one ply, wherein the controller or a further controller controls the at least one sorting robot such that during use the at least one sorting robot selectively loads each carrier of the at least one buffer with the at least one ply, wherein the preforming system is arranged such that during use the sorting robot and the placement robot can access a same buffer of the at least one buffer without relocating the placement robot, the sorting robot and the at least one buffer with respect to each other, wherein each carrier is releasably mounted to the at least one buffer, wherein the handling part of the at least one sorting robot is further arranged to handle each carrier, such that each carrier are transferrable to and from the at least one buffer by means of the sorting robot.

2. The preforming system according to claim 1, comprising an assessment device configured to assess a position and orientation of the at least one ply relative to the ply manipulating part of the placement robot when manipulating the at least one ply from the selected carrier, wherein the assessment device is coupled to the controller, and wherein the controller controls the placement robot at least partly based on the assessed position and orientation to place the at least one ply at the desired location with the preselected attitude.

3. The preforming system according to claim 2, wherein the assessment device is a stationary optical device, wherein the controller controls the placement robot to present the at least one ply to the stationary optical device for assessing the position and orientation of the at least one ply relative to the ply manipulating part of the placement robot.

4. The preforming system according to claim 2, wherein the controller controls the placement robot based only on the assessed position and orientation of the at least one ply relative to the ply manipulating part of the placement robot to align the at least one ply for placement at the desired location with the preselected attitude.

5. The preforming system according to claim 1, wherein the carriers are movable relative to the at least one buffer and to each other, and wherein the controller controls the movement of the carriers and/or the at least one buffer such that, during use, the at least one ply is made available to at least the ply manipulating part of the placement robot for manipulation and transport of the at least one ply from the selected carrier.

6. The preforming system according to claim 1, wherein each carrier comprises a substantially planar support face.

7. The preforming system according to claim 1, comprising a transportation track, wherein the at least one buffer comprises a plurality of buffers disposed along the transportation track, wherein the transportation track comprises a manipulator for manipulating and transporting the at least one ply along the transportation track between the plurality of buffers, wherein the manipulator is or comprises the at least one sorting robot, such that the at least one sorting robot is transportable along the transportation track between the plurality of buffers.

8. The preforming system according to claim 1, comprising at least one ply feed.

9. The preforming system according to claim 8, wherein the at least one sorting robot is arranged to transport the at least one ply from the at least one ply feed and to the at least one buffer to selectively load each carrier of the at least one buffer.

10. The preforming system according to claim 8, wherein the at least one buffer and the at least one ply feed are disposed along a transportation track comprising a manipulator for manipulating and transporting the at least one ply along the transportation track between the at least one ply feed and the at least one buffer, wherein the manipulator is or comprises the at least one sorting robot, such that the at least one sorting robot is transportable along the transportation track between the at least one ply feed and the at least one buffer.

11. The preforming system according to claim 8, wherein each ply feed comprises a dedicated feed buffer, the preforming system comprising at least one supply robot for handling and transporting the at least one ply, wherein the controller or a further controller controls the at least one supply robot to selectively load each carrier of the dedicated feed buffer with the at least one ply.

12. The preforming system according to claim 1, wherein said same buffer is accessible from at least two sides.

13. The preforming system according to claim 12, wherein each carrier is releasably mounted to the at least one buffer and may transit through the at least one buffer.

14. A method for automated sequential laying of plies at a desired location with a preselected attitude to preform a composite structure, comprising the steps of:
providing the preforming system according to claim 1 including the at least one buffer provided with the two or more carriers;
providing each carrier with at least one ply of the same type, such that the carriers in-a-whole carry at least two types of plies;
keeping track of the position, type and sequential order of each at least one ply on each carrier of the at least one buffer;
selecting a carrier from the at least two carriers to make the selected carrier with the at least one ply available to the ply manipulating part of the placement robot;
manipulating the at least one ply from the selected carrier by means of the ply manipulating part of the placement robot;
transporting the at least one ply by means of the placement robot to the substrate; and
placing the transported at least one ply by means of the ply manipulating part at the desired location with the preselected attitude on the substrate.

15. The method according to claim 14, further comprising the steps of:
assessing a position and an orientation of the manipulated at least one ply relative to the ply manipulating part; and
aligning the manipulated at least one ply for placement at the desired location with the preselected attitude based only on the assessed position and orientation of the manipulated at least one ply relative to the ply manipulating part of the placement robot.

16. The method according to claim 15, wherein assessing the position and orientation of the manipulated at least one ply relative to the ply manipulating part includes recording an image of the manipulated at least one ply on the ply manipulating part.

17. The method according to claim 14, further comprising the steps of:
feeding the at least one ply from a ply feed; and
keeping track of the position, type, and sequential order of the at least one ply fed from the ply feed.

18. The method according to claim 14, wherein the plies are fiber reinforced plies.

* * * * *